(12) United States Patent
Liu et al.

(10) Patent No.: US 10,971,945 B2
(45) Date of Patent: Apr. 6, 2021

(54) BENDABLE WIRELESS CHARGING APPARATUS

(71) Applicant: Nano and Advanced Materials Institute Limited, Hong Kong (HK)

(72) Inventors: Chenmin Liu, Hong Kong (HK); Shengbo Lu, Hong Kong (HK); Wing Lung Hon, Hong Kong (HK)

(73) Assignee: Nano and Advanced Materials Institute Limited, Hong Kong (HK)

(*) Notice: Subject to any disclaimer, the term of this patent is extended or adjusted under 35 U.S.C. 154(b) by 78 days.

(21) Appl. No.: 16/407,207

(22) Filed: May 9, 2019

(65) Prior Publication Data

US 2019/0273387 A1 Sep. 5, 2019

Related U.S. Application Data

(63) Continuation-in-part of application No. 15/924,299, filed on Mar. 19, 2018, now Pat. No. 10,490,843.

(Continued)

(51) Int. Cl.
| | | |
|---|---|---|
| *H01M 10/0525* | (2010.01) | |
| *H02J 7/02* | (2016.01) | |
| *H02J 7/00* | (2006.01) | |
| *H01F 38/14* | (2006.01) | |
| *H01F 27/28* | (2006.01) | |

(Continued)

(52) U.S. Cl.
CPC .......... *H02J 7/025* (2013.01); *H01F 27/2804* (2013.01); *H01F 27/2885* (2013.01); *H01F 27/36* (2013.01); *H01F 38/14* (2013.01); *H01M 10/0525* (2013.01); *H01M 10/425* (2013.01); *H01M 10/46* (2013.01); *H01M 50/116* (2021.01); *H01M 50/24* (2021.01); *H02J 7/0031* (2013.01); *H02J 7/0042* (2013.01);

(Continued)

(58) Field of Classification Search
CPC ............ H01M 10/0525; H01M 10/46; H01M 10/0427; H01M 10/058; H01M 10/425; H01M 2004/021; H01M 2010/4271; H01M 2010/4292; H01M 2220/30; H01M 2/0275; H01M 2/1094; H01M 4/0404; H01M 4/0435; H01M 4/133; H01M 4/1393; H01M 4/587; H01M 4/663; Y02E 60/10; H01F 27/2804; H01F 38/14; H01F 2027/2809; H01F 27/2885; H01F 27/36; H02J 7/0031; H02J 50/00; H02J 50/005; H02J 50/10; H02J 7/0029; H02J 7/00302; H02J 7/00304; H02J 7/00306; H02J 7/0042; H02J 7/025; H02J 7/027; H02J 7/06

See application file for complete search history.

(56) References Cited

U.S. PATENT DOCUMENTS

| | | | | |
|---|---|---|---|---|
| 2011/0050164 | A1* | 3/2011 | Partovi | H02J 7/00034 320/108 |
| 2017/0005504 | A1* | 1/2017 | Rho | G04G 17/04 |

* cited by examiner

*Primary Examiner* — Victoria H Lynch
(74) *Attorney, Agent, or Firm* — Idea Intellectual Limited; Margaret A. Burke; Sam T. Yip (57) ABSTRACT

A bendable wireless charging apparatus having an operational bend radius of approximately 90 degrees is disclosed, which includes a flexible substrate, a receiving coil, a battery, a flexible EMI-shielding layer and a control module. The receiving coil is disposed on a surface of the substrate, and is electrically connected to the control module. The battery, which may also be flexible, is located beneath (Continued)

another surface of the substrate. The EMI-shielding layer is disposed between the receiving coil and the battery.

7 Claims, 8 Drawing Sheets

Related U.S. Application Data

(60) Provisional application No. 62/602,010, filed on Apr. 10, 2017, provisional application No. 62/673,141, filed on May 18, 2018, provisional application No. 62/788,149, filed on Jan. 4, 2019.

(51) Int. Cl.
*H01M 10/46* (2006.01)
*H01M 10/42* (2006.01)
*H02J 50/00* (2016.01)
*H01F 27/36* (2006.01)
*H01M 50/24* (2021.01)
*H01M 50/116* (2021.01)

(52) U.S. Cl.
CPC .............. *H02J 7/027* (2013.01); *H02J 50/00* (2016.02); *H01M 2010/4271* (2013.01)

BENDABLE WIRELESS CHARGING APPARATUS

CROSS-REFERENCE TO RELATED APPLICATIONS

This application claims priorities from the (1) U.S. provisional patent application Ser. No. 62/673,141 filed on May 18, 2018; (2) U.S. provisional patent application Ser. No. 62/788,149 filed Jan. 4, 2019; and this application is a continuation-in-part of the U.S. non-provisional patent application Ser. No. 15/924,299 filed Mar. 19, 2018, and the disclosures of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present invention relates to electronic charging apparatus, and, more particularly, to a flexible wireless charging apparatus with a battery having an operational bend radius of at least approximately 90 degrees.

BACKGROUND OF THE INVENTION

Recently, with the development of non-contact (i.e., wireless) charging technology, inductive wireless charging devices for wirelessly charging portable electronic devices have been introduced. Wireless power transfer may be defined as a resonant wireless transfer of power through magnetic induction between coils located at a power transmitting unit (PTU) and coils located at a power receiving unit (PRU). The PRU then transmits the received power to a battery for various types of portable electronic devices.

Wearable electronics, in particular, require thin and light batteries to ensure the comfort and safety of the wearer. As wearable electronics assume more complex shapes, there is a demand for batteries that can curve and flex along with the wearer's body. Although some flexible batteries have been disclosed, these batteries tend to includes various rigid or brittle components, such as ceramic separators, that limit the degree to which they may be bent. The PRU itself is also considered another challenge to be integrated with aforementioned flexible batteries. The receiving coil is typically formed from thick metal wire that is not readily bendable.

There is a need in the art for a wireless charging device that is bendable, along with a battery, particularly a flexible battery. Such a system may be used in bendable electronic devices such as portable, wearable electronics.

SUMMARY

It is the objective of the present invention to provide a wireless charging apparatus that addresses the aforementioned and other needs. According to one aspect of the present invention, a bendable wireless charging apparatus is provided that is integrated with a battery, particularly a flexible battery.

In accordance with an embodiment of the present invention, a bendable wireless charging apparatus includes a flexible substrate, a flexible receiving coil, a battery, a flexible EMI-shielding layer and a control module. The substrate has an operational bend radius of at least 90 degrees. The receiving coil is disposed on a surface of the substrate. The battery is located beneath another surface of the substrate. The EMI-shielding layer is disposed between the receiving coil disposed on the substrate and the battery. The control module is disposed or formed on a side of the substrate adjacent to the receiving coil, and is electrically connected to the receiving coil and the battery respectively.

According to another aspect of the present invention, a bendable wireless charging apparatus further comprises an additional output connection set to an external load which is able to allow a flexible battery to perform a wireless charging process and a discharging process to the external load simultaneously. The control module controls a charging process for the flexible battery and/or a discharging process for the load.

BRIEF DESCRIPTION OF THE DRAWINGS

The present invention is illustrated by way of example, and not by way of limitation, in the figures of the accompanying drawings in which like reference numerals refer to the same or similar elements and in which.

DETAILED DESCRIPTION

In the following description, the various batteries, including flexible batteries, and flexible wireless charging apparatus are set forth as examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
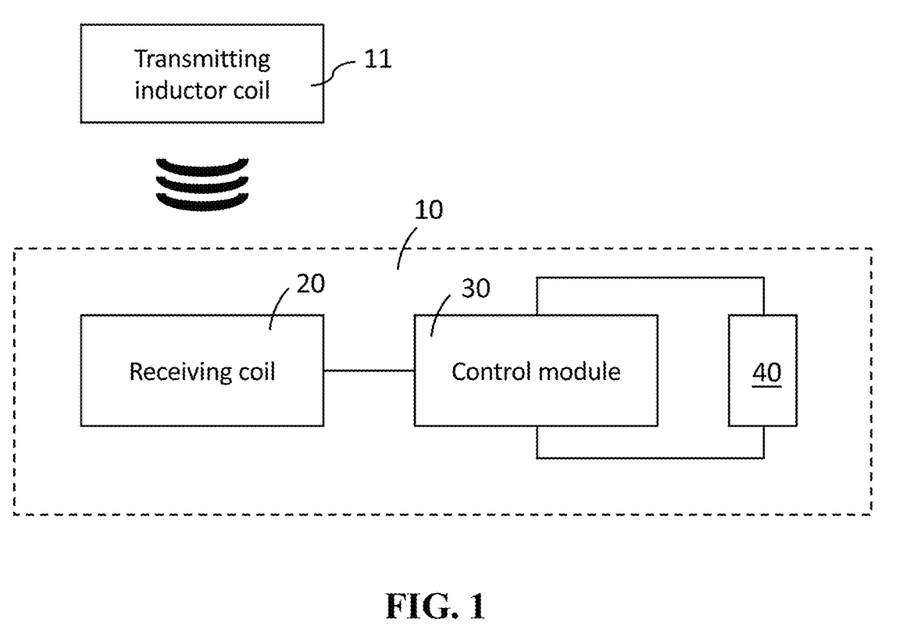
FIG. 1 is a schematic overview of a bendable wireless charging apparatus in accordance with an embodiment of the present invention.
Figure 2:
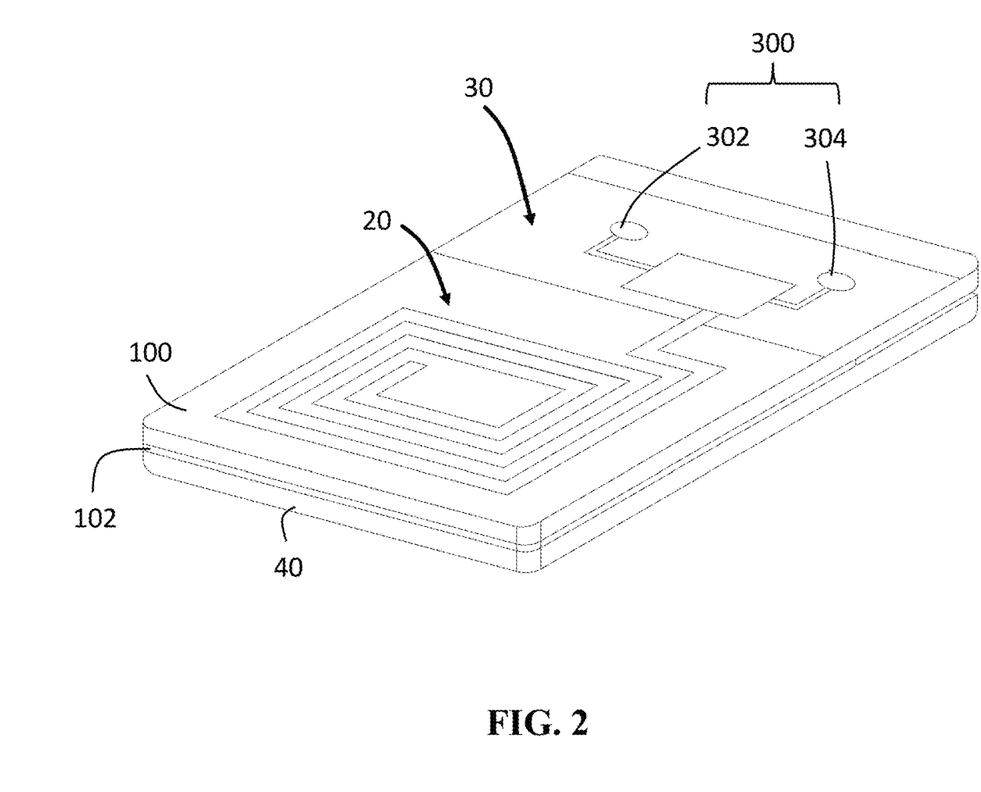
FIG. 2 is an exemplary diagram of illustrating a bendable wireless charging apparatus in accordance with the embodiment of the present invention.

With reference to FIGS. 1 and 2, FIG. 1 is a schematic overview of a bendable wireless charging apparatus in accordance with an embodiment of the present invention; FIG. 2 is an exemplary diagram of illustrating a bendable wireless in accordance with the embodiment of the present invention. In this embodiment, a bendable wireless charging apparatus 10 includes a flexible substrate 100, a substantially planar receiving coil 20, a battery 40, a flexible EMI-shielding (electromagnetic interference shielding) layer 102 and a control module 30. The substrate 100 has an operational bend radius of at least 90 degrees. By the expression "operational bend radius" it is meant that that the charging apparatus can bend to at least 90 degrees and still electronically and mechanically function. Optionally, it may bend up to 120 degrees or 180 degrees (fully folded in half) and still function normally. The receiving coil 20 is disposed on a surface of the substrate 100, and is configured for receiving energy from an external transmitting inductor coil 11. This external transmitting inductor coil 11 is typically connected to a power supply, such as a conventional wall power outlet or to a computer power source through a USB port. Note that the battery 40 may be a flexible battery, to be discussed in further detail below. Alternatively, it may be a very small battery, such as a button battery or thin film battery, that permits the charging apparatus to flex and bend without interference due to its small size. The battery is optionally positioned beneath the substrate on which inductor coil 11 is formed. The EMI-shielding layer 102 is disposed between the receiving coil 20 and the battery 40. The control module 30 is disposed or formed on a side of the substrate 100 adjacent to the receiving coil 20, and is electrically connected to the receiving coil 20 and the battery 40 respectively.

The control module 30 further comprises a first output connection set 300 formed with two electrodes 302, 304 (e.g., conductive pads) that indicate the positive and negative terminals to the corresponding flexible battery 40.

Figure 3:
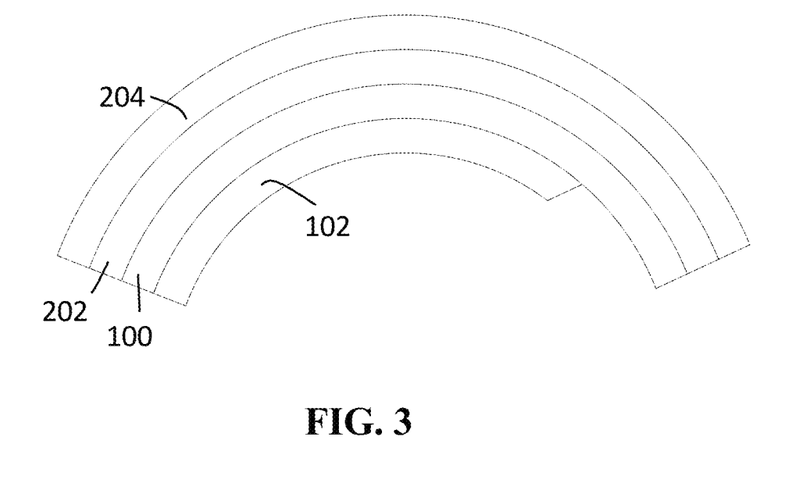
FIG. 3 is an exemplary diagram illustrating a sectional view of the bendable wireless charging apparatus without the flexible battery.

With further reference to FIG. 3, FIG. 3 is an exemplary diagram illustrating a sectional view of the bendable wireless charging apparatus without the flexible battery. The receiving coil 20 is formed with a metal layer 202 and at least one cover layer 204 attached to the metal layer 202, wherein the metal layer 202 is fabricated on the flexible substrate 100 by an addictive or a subtractive coating method. The material for the metal layer 202 may be copper, silver, copper alloy, silver composite or combination thereof. The at least one cover layer 204 protects the metal layer 202 from mechanical damage or oxidation, and further comprises an optional adhesive layer (not shown) over the metal layer 202 followed by the cover layer 204. The materials for the substrate 100 and the cover layer 204 may be thin sheets of polyimide (PI), polyether ether ketone (PEEK), transparent conductive polyester films, elastomer films, polyethylene terephthalate (PET) or combinations thereof.

The thickness of the metal layer 202 is in a range of 5-100 um, and the thickness of the substrate 100 or the cover layer 204 is in a range of 2-100 um.

The EMI-shielding layer 102 may be formed of materials absorbing or reflecting electromagnetic waves such as thermoplastic or elastomer materials (or combinations thereof with conducting metal films or with powder or fiber fillers such as metallic/carbon powders or fibers. Exemplary EMI shielding materials include copper and nickel coated polyurethane sheets and silicone rubber with embedded magnetic ferrite particles.

Figure 4:
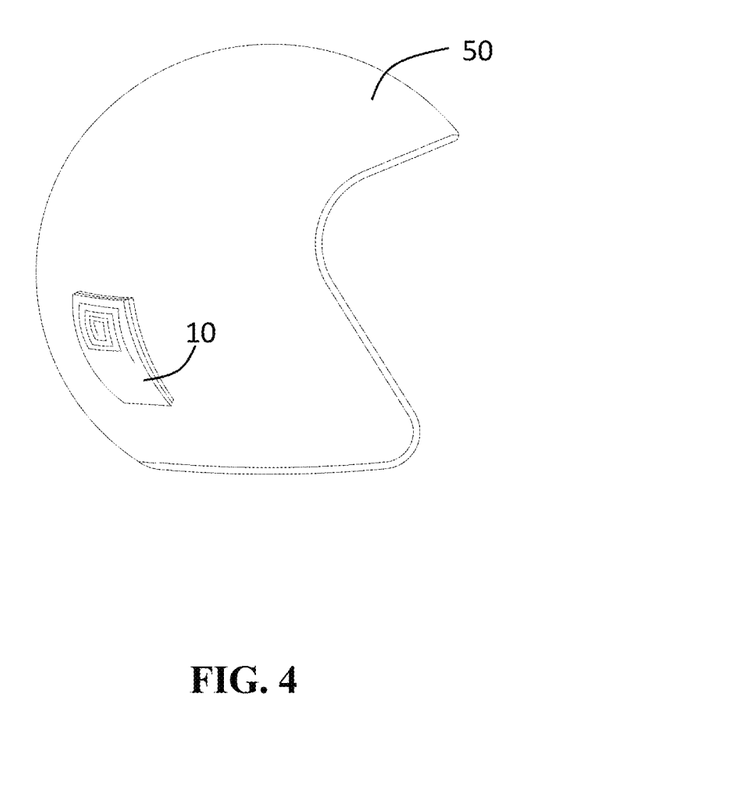
FIG. 4 is an exemplary diagram illustrating an actual implementation of the bendable wireless charging apparatus in accordance with an embodiment of the present invention.

With reference to FIG. 4, FIG. 4 is an exemplary diagram illustrating an implementation of a wireless charging apparatus in accordance with an embodiment of the present invention. In this embodiment, the wireless charging apparatus is mounted on the outer surface of a helmet. As shown in FIG. 4, the wireless charging apparatus 10 is bent into a curve along the contour of the helmet 50. The apparatus may be used to power lights positioned on the helmet (not shown), for example, signal lights that indicate that the wearer is making a right turn, a left turn, or has applied the brakes.

The receiving coil of the bendable wireless apparatus according to the present invention is able to withstand at least 2000 cycles of repeating bending from radius of 20-40 mm and at least 120 degrees of bending angle without loss of charging performance.

Figure 5:
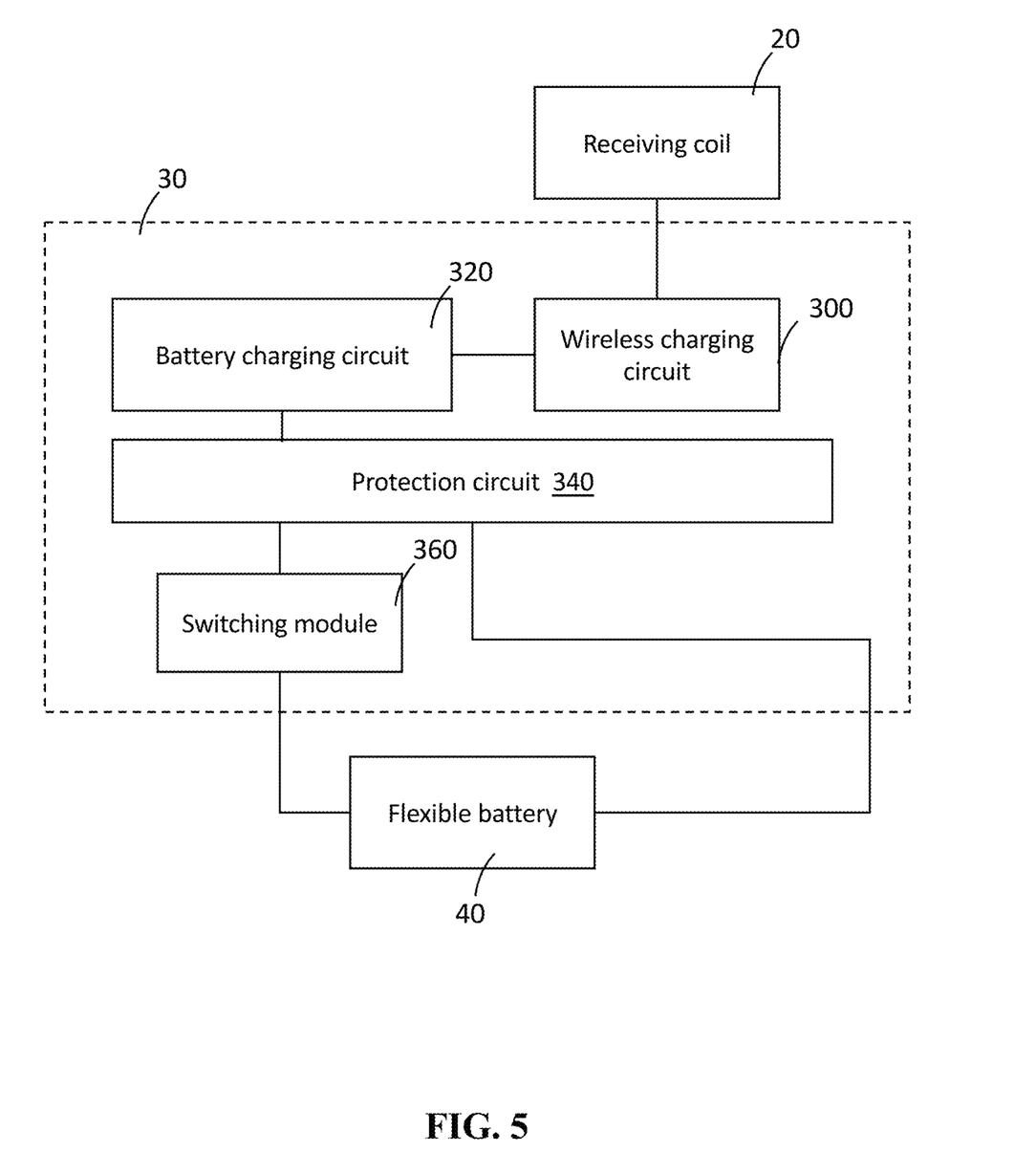
FIG. 5 is a schematic overview of the control module in accordance with an embodiment of the present invention.

With reference to FIGS. 1, 2 and 5, FIG. 5 is a schematic overview of the control module in accordance with an embodiment of the present invention. In this embodiment, the control module 30 comprises a wireless charging circuit 300, a battery charging circuit 320 and a protection circuit 340 which are connected in series.

The wireless charging circuit 300 is electrically connected to the receiving coil 20. The battery charging circuit 320 regulates the voltage and current coming from the wireless charging circuit 300, and outputs the regulated voltage and current to the protection circuit 340.

The protection circuit is connected to the battery through the first output connection set, and further comprises a switching module that is connected between the protection circuit and the battery. The protection circuit is configured for sensing and controlling the switching module. The switching module is turned OFF when the current or the voltage input from the battery charging circuit exceeds or falls below a predetermined value, which avoids faulty charging of the flexible battery. The predetermined value is defined as a threshold for corresponding scenarios including short circuit, overcharge and undercharge. A person skilled in the art will realize that the predetermined value is alterable based on the desired use or the type of the flexible battery. For example, the range of over voltage measured between the first output connection set may be selected as 3.5 to 5 volts, and the range of under voltage may be selected as 2-3 volts.

Figure 6:
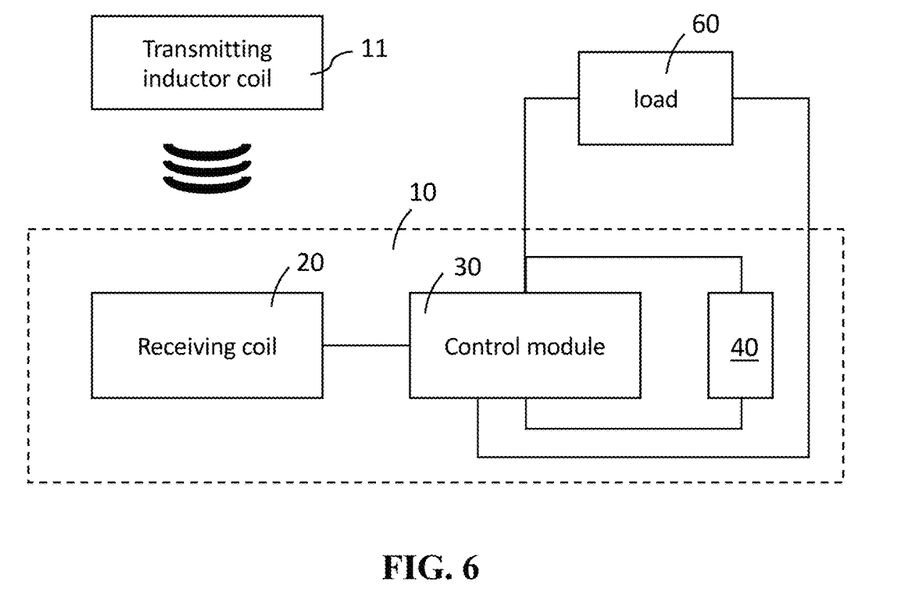
FIG. 6 is a schematic overview of a bendable wireless charging apparatus in accordance with another embodiment of the present invention.
Figure 7:
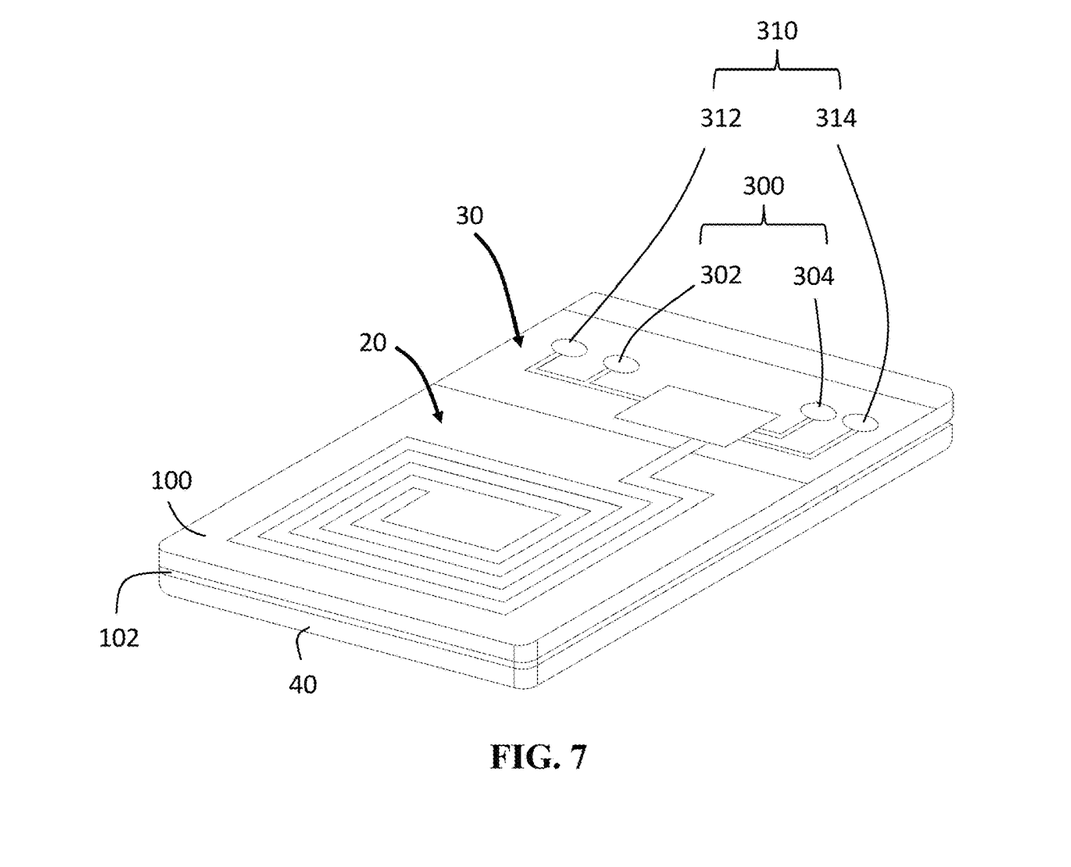
FIG. 7 is an exemplary diagram of illustrating a bendable wireless in accordance with the embodiment illustrated in FIG. 6.
Figure 8:
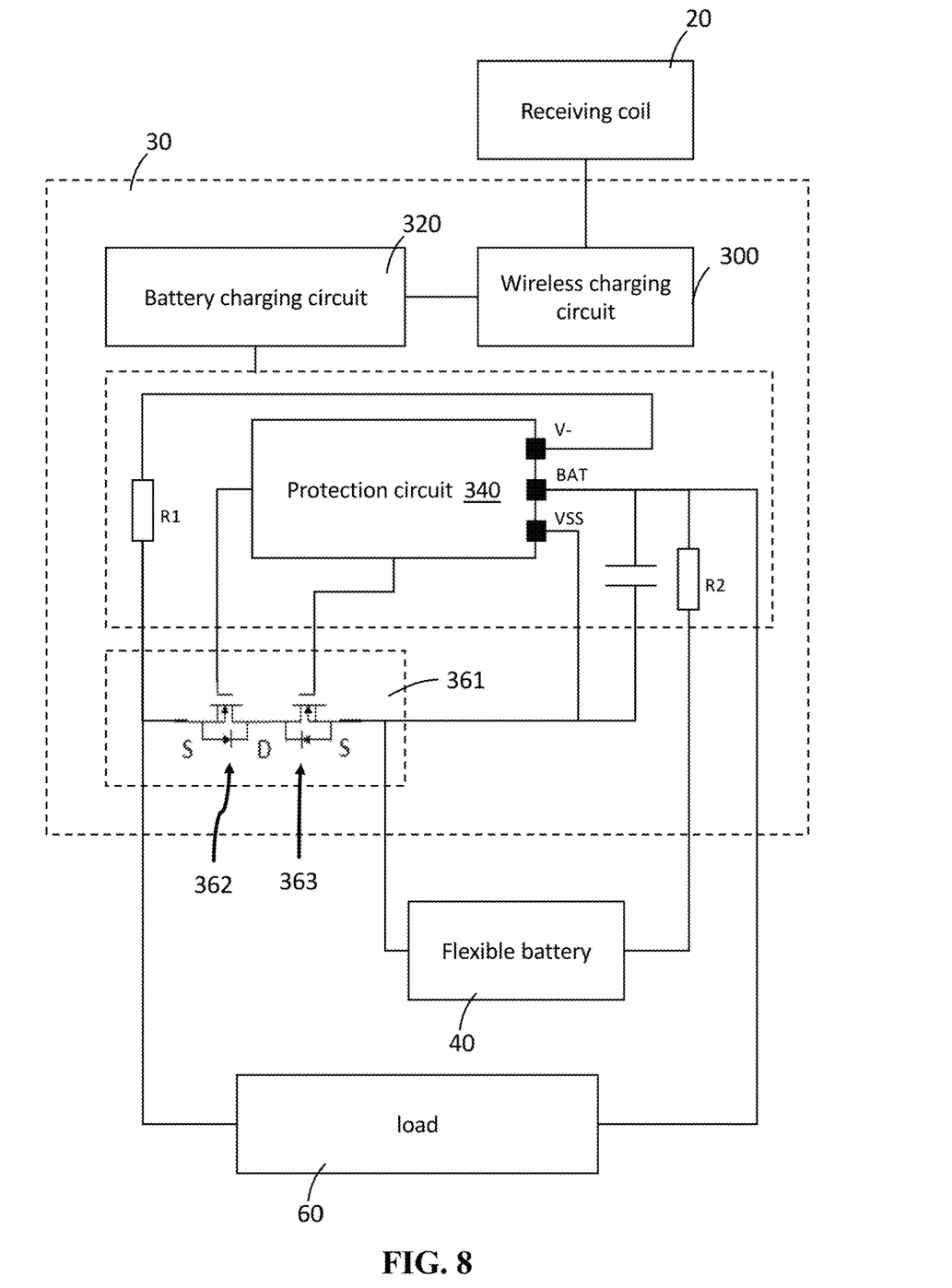
FIG. 8 is a schematic overview of the bendable wireless charging apparatus in accordance with the embodiment illustrated in FIG. 6.

With reference to FIGS. 6-8, FIG. 6 is a schematic overview of a bendable wireless charging apparatus in accordance with another embodiment of the present invention; FIG. 7 is an exemplary diagram illustrating a bendable wireless charging apparatus in accordance with the embodiment illustrated in FIG. 6; FIG. 8 is a schematic overview of the control module in accordance with the embodiment illustrated in FIG. 6. This embodiment is similar to the embodiment illustrated in FIG. 1. The difference is that the control module of the embodiment illustrated in FIG. 6 further comprises a second output connection set 310 electrically coupled to an external load, system or electronic device (hereinafter referred to "load 60"), and a switching module 361 that is formed with a charging switch and a discharging switch cascaded in series.

In this embodiment, as shown in FIGS. 6 and 7, the control module 30 is placed on a side of the substrate 100 adjacent to the receiving coil 20, and is electrically connected to the receiving coil 20, the flexible battery 40 and the load 60, which controls the charging process for the flexible battery 40 and/or the discharging process for the load 60. The flexible battery 40 is located underneath the EMI-shielding layer 102. The load 60 is not shown in FIG. 7, but it can be considered to be any kind of battery driven electronic device, such as cordless electric toothbrushes, smart watches or smart glasses. A person skilled in the art will realize that the implementation and configuration for wireless charging to these devices can be different which the bendable wireless charging apparatus of the present invention will typically be positioned in corresponding device with its flexible ability.

As shown in FIG. 8, the switching module 361 comprises a charging switch 362 and a discharge switch 363. In this embodiment, each of the charging and discharging switches 362, 363 may be a N-type MOSFET (Metal-Oxide-Semiconductor Field-Effect Transistor). Each MOSFET has a gate, a drain and a source. The gates of the charging and discharging switches 362, 363 are connected to the protection circuit 340 respectively. The drains of the charging and discharging switches 362, 363 are connected to each other. The source of the charging switch 362 is connected to the negative terminal of the load 60. The source of the discharging switch 363 is connected to the negative terminal of the flexible battery 40. The positive terminals of the flexible battery 40 and the load 60 are connected to a common node.

The battery charging circuit 320 regulates the voltage and current coming from the wireless charging circuit 300, and outputs the regulated voltage and current to the protection circuit 340 via VBAT indicated in FIG. 8. The protection circuit 340 will continuously monitor the battery 40 and the load 60 by detecting their voltage and/or current status.

As described in the above paragraphs, the protection circuit 340 comprises multiple predetermined values for identifying whether the bendable wireless charging apparatus of the present invention is working properly. When the voltage detected is higher or lower than a certain predetermined value during charging or discharging process, the protection circuit 340 will selectively lower the voltage on the gate of the charging switch 362 during the charging process or the discharging switch 363 during the discharging process. The charging and discharging switches 362, 363 will be switched OFF due to a low gate voltage, and thus the protection circuit 340 will be in an open status resulting from the large resistance of the OFF MOSFET type switch.

In contrast, for the conventional wireless charging apparatus without additional (i.e., the second) output connection set, the corresponding external load or electronic device may still connect and retrieve power from the battery. The benefit of having the second output connection set coupled to the protection circuit of the control module is that the wireless charging apparatus of the present invention is not only able to prevent damage to the battery from over charging or over discharging during both charging and discharging processes, but also preforms wireless charging to the battery, and discharging to the load simultaneously. The practicality and convenience of the present invention is enhanced.

Figure 9:
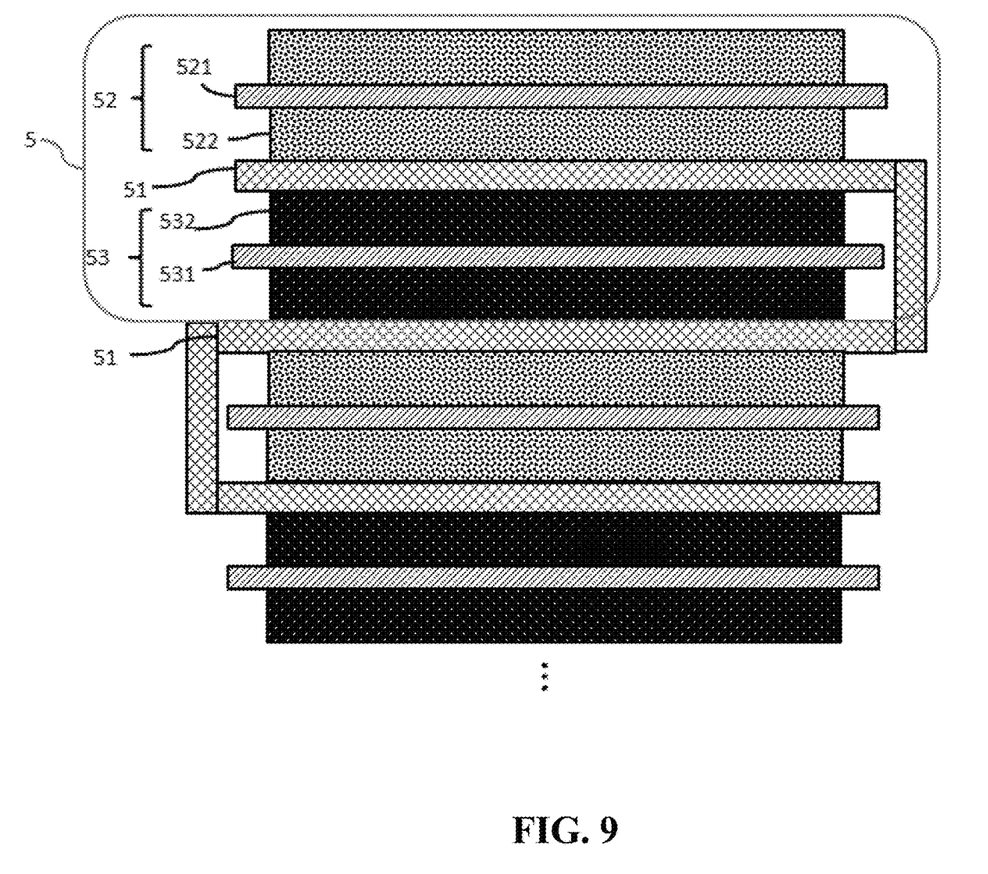
FIG. 9 depicts a flexible battery structure that may be used with the bendable wireless charging apparatus of FIG. 1.

FIG. 9 schematically depicts a cross-section of a portion of a flexible, foldable lithium ion battery that may be employed as battery 40 in the bendable wireless charging system of the present invention. The battery has an operational bend radius of 180 degrees. The term "operational bend radius" as used herein, is the degree to which a battery may be curved and still generate electrical power without an interruption in operation. An operation bend radius of 180 degrees means that a battery may be completely folded upon itself while still generating electrical power.

In FIG. 9, element 5 represents a single cell of a battery that includes a first current collector 521, a second current collector 531, and a separator, 51. The first current collector 521 may be selected from a metal such as aluminum. The aluminum may be a sheet having a thickness of approximately 5 microns to approximately 100 microns. An active material 522 may be coated on one or both sides of the aluminum sheet to form a cathode. Active materials may be selected from, for example, $LiCoO_2$ $LiMn_2O_4$, $Li_2MnO_3$, $LiNiMnCoO_2$, $LiNiCoAlO_2$, $LiFePO_4$, or $LiNi_{0.5}Mn_{1.5}O_4$ however other active materials and mixtures thereof may also be used.

The second current collector may be selected from a metal such as copper. The copper may be a sheet having a thickness of approximately 5 microns to approximately 100 microns. An active material 532 may be coated on one or both sides of the copper sheet to form an anode. Active materials for the anode include carbon-based active materials such as graphite, carbon nanotubes, graphene, silicon, silicon/carbon composites, germanium, tin, metal oxides, metal hydrides, and mixtures thereof.

A separator is positioned between the current collectors, preventing contact of the current collectors with each other. The separator 51 is a highly porous, highly elastic polymer fiber mat sponge with resilience sufficient to maintain separation of the current collectors 521 and 531 despite bending, folding, cutting, or foreign object penetration of the battery. As used herein, the term "sponge" relates to a porous, absorbent, and elastic structure that holds liquid while maintaining resilience. A sponge returns to its original shape following deformation, that is, a sponge may be squeezed into a smaller area as long as an external force is maintained. Once the external force is removed, the sponge regains its original shape and volume. As a sponge, the separator securely holds a liquid electrolyte but also maintains sufficient absorbing capability to hold the liquid electrolyte in a leak-free condition when an outer battery housing is punctured or cut, preventing escape of hazardous electrolyte. Also, the resiliency of the separator sponge returns the electrodes to their proper, separated positions following mechanical abuse (such as cutting and puncturing), giving the overall structure a self-recovery property. The term "self-recovery," as used herein, relates to a battery structure that can return its original configuration following mechanical abuse such that generation of power resumes following an interruption caused by mechanical abuse. The separator sponges, due to their sponge properties, return to their original shape and volume, enabling self-recovery of the overall battery structure.

The electrolyte used in the battery may include one or more organic solvents such as one or more of ethylene carbonate, dimethyl carbonate, and diethyl carbonate. Dissolved in the solvent are one or more lithium salts such as $LiPF_6$, $LiBF_4$, or $LiClO_4$. The composition of the electrolyte is typically adjusted based on the active materials selected for use in the cathode and anode.

Figure 10:
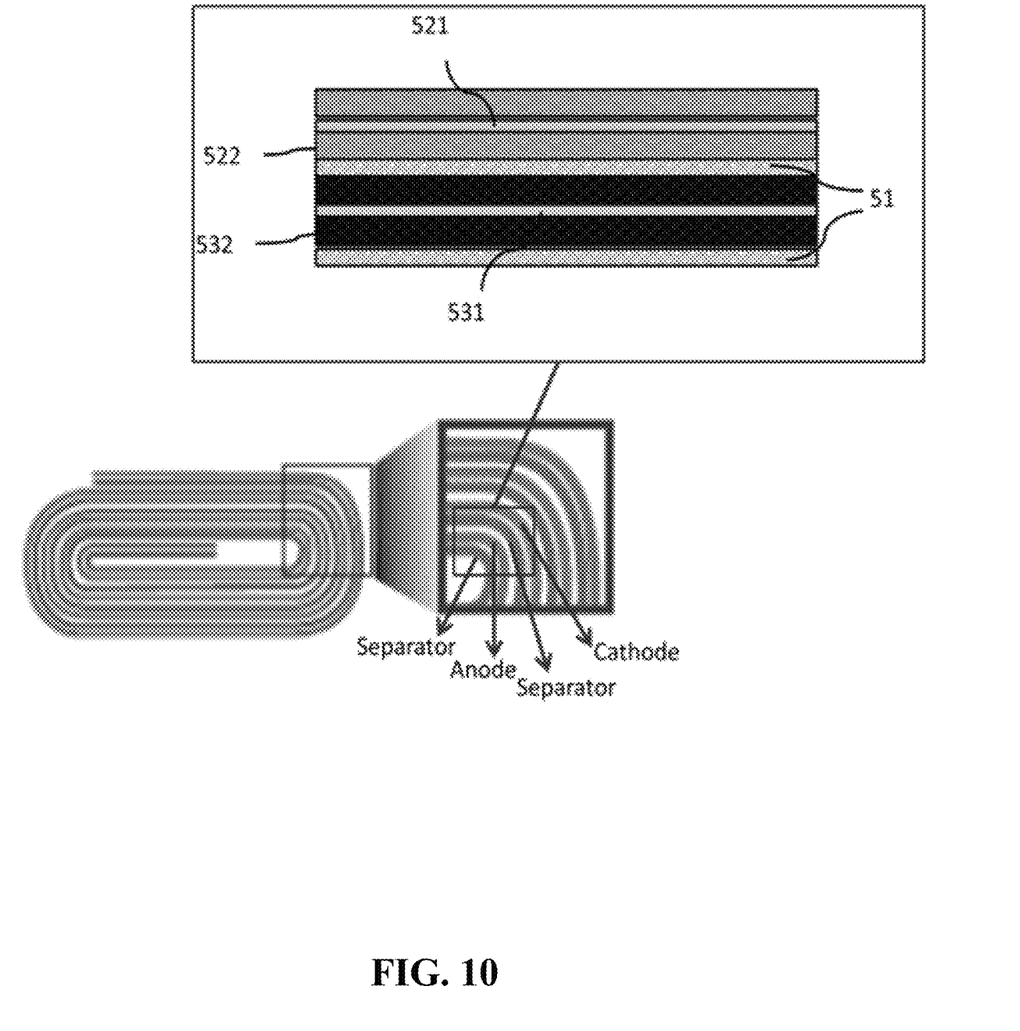
FIG. 10 depicts a jellyroll battery structure that may be used with the bendable wireless charging apparatus of FIG. 1.

Although FIG. 9 depicts a cell of a battery based on a stacked structure of components, layers of components may be formed and rolled into a so-called "jellyroll" structure, as depicted in FIG. 10. In FIG. 10, the separator layer 51 is positioned not only between the cathode and anode of each "cell" layer but is also positioned between adjacent cell layers to prevent shorting between electrodes, creating an overall flexible and resilient structure that is self-recoverable.

The separator sponge may be formed from a mat of submicron fibers. In one aspect, the fibers may have a diameter of between approximately 100 nm to 300 nm. The porosity may be about 60% to about 90% with an average pore size of less than about 1 micron. In particular, the submicron fibers may be fabricated from polymers such as poly(vinylidene fluoride) (PVDF), polyimide (PI), polyamide (PA), polyacrylonitrile (PAN), poly(ethylene terephthalate) (PET), poly(vinylidene fluoride-hexafluoropropylene) (PVDF-HFP), poly(vinylidene fluoride-co-chlorotrifluoroethylene) (PVDF-co-CTFE), or mixtures thereof.

In another embodiment, separator sponge may be a nonwoven polymer fiber mat in which the polymer fibers are a composite of a first polymer material and a second polymer material. The first polymer material may include poly(vinylidene fluoride) (PVDF), polyimide (PI), polyamide (PA) or polyacrylonitrile (PAN). The second polymer material may include polyethylene glycol (PEG), polyacrylonitrile (PAN), poly(ethylene terephthalate) (PET), poly(vinylidene fluoride) (PVDF), poly(vinylidene fluoride-hexafluoropropylene) (PVDF-HFP) or poly(vinylidene fluoride-co-chlorotrifluoroethylene) (PVDF-co-CTFE), wherein the second polymer material is different from the first polymer material. The first and second polymer materials may be in a weight ratio ranging from about 3:1 to about 1:1, more particularly about 3:1 to about 2:1, and more particularly about 3:1 to about 3:2, and more particularly about 3:1.

PVDF has been widely used for making ultrafiltration and microfiltration membranes owing to its excellent chemical resistance and good thermal stability. Pure PVDF polymer has a high melting point and crystallinity, and good mechanical properties. However, it is only soluble in a limited number of solvents, such as N-methyl-2-pyrrolidone (NMP), N,N-dimethylacetamide (DMAC), N,N-dimethylformamide (DMF), dimethyl sulfoxide (DMSO), and shows low swelling ability when soaked in common electrolytes.

The copolymer PVDF-HFP can improve the electrolyte solubility, making the polymer soluble in common organic solvents, such as acetone and tetrahydrofuran (THF), which can further improve the processing capability. In addition, it has very high swelling ability which can enhance the electrolyte uptake for the separator layer.

The inventors of the present application found that a composite of PVDF and PVDF-HFP offers many advantages over other polymers in the fabrication of separators, such as: electrochemically stable from 0 to 5V vs $Li^+/Li$; better solubility than pure PVDF alone which enhances processing; faster wettability of electrolytes than PVDF; better controlled leakage of electrolyte; durable adhesion with electrodes; and good flexibility.

The composite material may be formed into a nonwoven fiber mat by electrospinning, described in further detail below. The electrospinning may be from a polymer formulation onto aluminum foil to give a freestanding separator. The polymer formulation may include the first and second polymer materials in a total amount of about 15-25 wt. % of the formulation, preferably about 15-20 wt. %, and more preferably about 16.5 wt. %. The polymer formulation for electrospinning the separator sponge may further include about 1-5 wt. % of the at least one additive, preferably about 2-5 wt. %, more preferably about 3-5 wt. %, and most preferably about 5 wt. %. The additive may be lithium chloride (LiCl) to facilitate ion transfer across the separator and facilitate the electrospinning process by increasing the conductivity of the polymer solution. In a preferred embodiment, the polymer formulation may include about 0.1-0.6 μg of LiCl, preferably about 0.1-0.5 μg more preferably about 0.2-0.4 μg, and most preferably about 0.3-0.4 μg.

In another embodiment, in conjunction with any of the above and below embodiments, the polymer formulation for electrospinning the nonwoven nanofiber separator of the present application may include at least one solvent selected from the group consisting of N-methyl-2-pyrrolidone (NMP), N,N-dimethylacetamide (DMAC), N,N-dimethylformamide (DMF), dimethyl sulfoxide (DMSO), acetone and tetrahydrofuran (THF). In a preferred embodiment, the polymer formulation may include DMF and acetone. In another preferred embodiment, the polymer formulation may include DMF and acetone in a weight ratio ranging from about 3:1 to about 1:1, preferably about 2:1 to about 1:1, more preferably about 1.5:1 to 1:1, and most preferably about 1.25:1.

In another embodiment, in conjunction with any of the above and below embodiments, the nonwoven nanofiber separator of the present application may be electrospun by the following steps: adding the first and second polymer materials into the at least one solvent, optionally together with LiCl; heating the mixture at around 80-100° C. with stirring for about 2-5 hours; and optionally adding the at least one additive, followed by heating at around 80-100° C. for about 2-5 hours; cooling the polymer formulation solution to room temperature; and loading the polymer formulation solution into a carriage for electrospinning.

Electrospinning of the separator sponge of the present application may be performed under the following parameters: Temperature: about 20-30° C.; Voltage: about 20-50 kV; Relative humidity (RH): about 25-60%; Spinner height: 100-150 mm; and Feed rate: 5.5-8.5 ml/h.

In another aspect, an additive of tetramethyl orthosilicate (TMOS) or tetraethyl orthosilicate (TEOS) may be used with the polymer formulation. These additives can be hydrolyzed into ceramic components, thereby improving the surface texture and enhancing dimensional stability of the separator sponge.

Figure 11A:
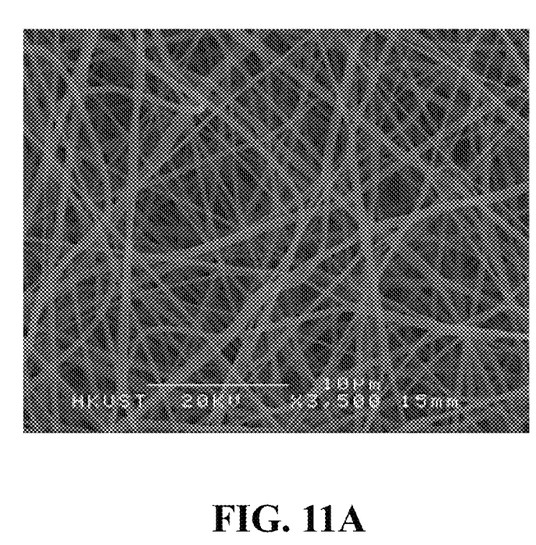
FIG. 11A depicts the structure of a separator sponge vs. a prior art separator shown in FIG. 11B.
Figure 11B:
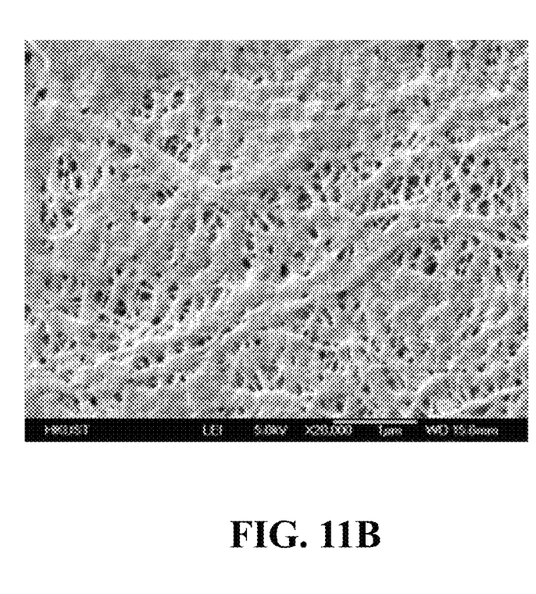

The microstructure of an exemplary separator sponge is depicted in FIG. 11A; as seen in FIG. 11A, the individual fibers are readily distinguishable and numerous pores are formed for a porosity of approximately 80 percent. By comparison, the microstructure of a prior art commercial separator (Celgard 2400 polypropylene separator) having a porosity of about 40 percent is shown in FIG. 11B. In this lower porosity structure, the individual fibers are not as readily distinguishable. The individually-interconnected fibers in the sponge of FIG. 11A create the flexible and resilient separator sponge that contributes to the self-recovery properties of the batteries of the various embodiments.

While the disclosure has been described in connection with a number of embodiments and implementations, the disclosure is not so limited but covers various obvious modifications and equivalent arrangements, which fall within the purview of the appended claims. Although features of the disclosure are expressed in certain combinations among the claims, it is contemplated that these features can be arranged in any combination and order.

The invention claimed is:

1. A bendable wireless charging apparatus comprising:
   a flexible substrate having an operational bend radius of at least 90 degrees;
   a planar receiving coil being configured for receiving power from an external transmitting inductor coil, disposed as a layer on a surface of the flexible substrate;
   a flexible battery positioned having an operational bend radius of at least 90 degrees;
   a flexible, planar EMI-shielding layer disposed between the receiving coil and the flexible battery, and being configured for blocking electromagnetic interference from the receiving coil; and a control module being disposed or formed on a side of the substrate adjacent to the receiving coil, electrically communicating with the receiving coil, the flexible battery and an external load, wherein the control module is configured for controlling a charging process for the flexible battery and a discharging process for the load, wherein the control module further comprises a wireless charging circuit, a battery charging circuit and a protection circuit connected in series, wherein the wireless charging circuit is connected to the receiving coil, and a switching module is connected between the protection circuit and the flexible battery.

2. The apparatus as claimed in claim 1, wherein the switching module comprises a charging switch and a discharging switch in a series connection.

3. The apparatus as claimed in claim 2, wherein the protection circuit selectively turns on and off the charging switch in the charging process or the discharging switch in the discharge process by comparing predetermined values with a voltage and/or current of the flexible battery or the load.

4. The apparatus as claimed in claim 2, wherein the charging switch and discharging switch is a MOSFET component that has a gate, a drain and a source, wherein the gates of the charging and discharging switches are connected to the protection circuit respectively;

wherein the drains of the charging and discharging switches are connected to each other;

wherein the source of the charging switch is connected to the negative terminal of the load;

wherein the source of the discharging switch is connected to the negative terminal of the flexible battery, and the positive terminals of the flexible battery and the load are connected to a common node.

5. The apparatus as claimed in claim 1, wherein the flexible battery is a lithium ion battery.

6. The apparatus as claimed in claim 5, wherein the lithium ion battery includes an electrospun polymer fiber separator sponge.

7. The apparatus as claimed in claim 6, wherein the lithium ion battery is a self-recovering lithium ion battery.

* * * * *